April 29, 1941.  W. McK. MARTIN  2,239,726
DEVICE FOR MEASURING CONSISTENCY OF A PRODUCT
Filed Jan. 11, 1938  4 Sheets-Sheet 2

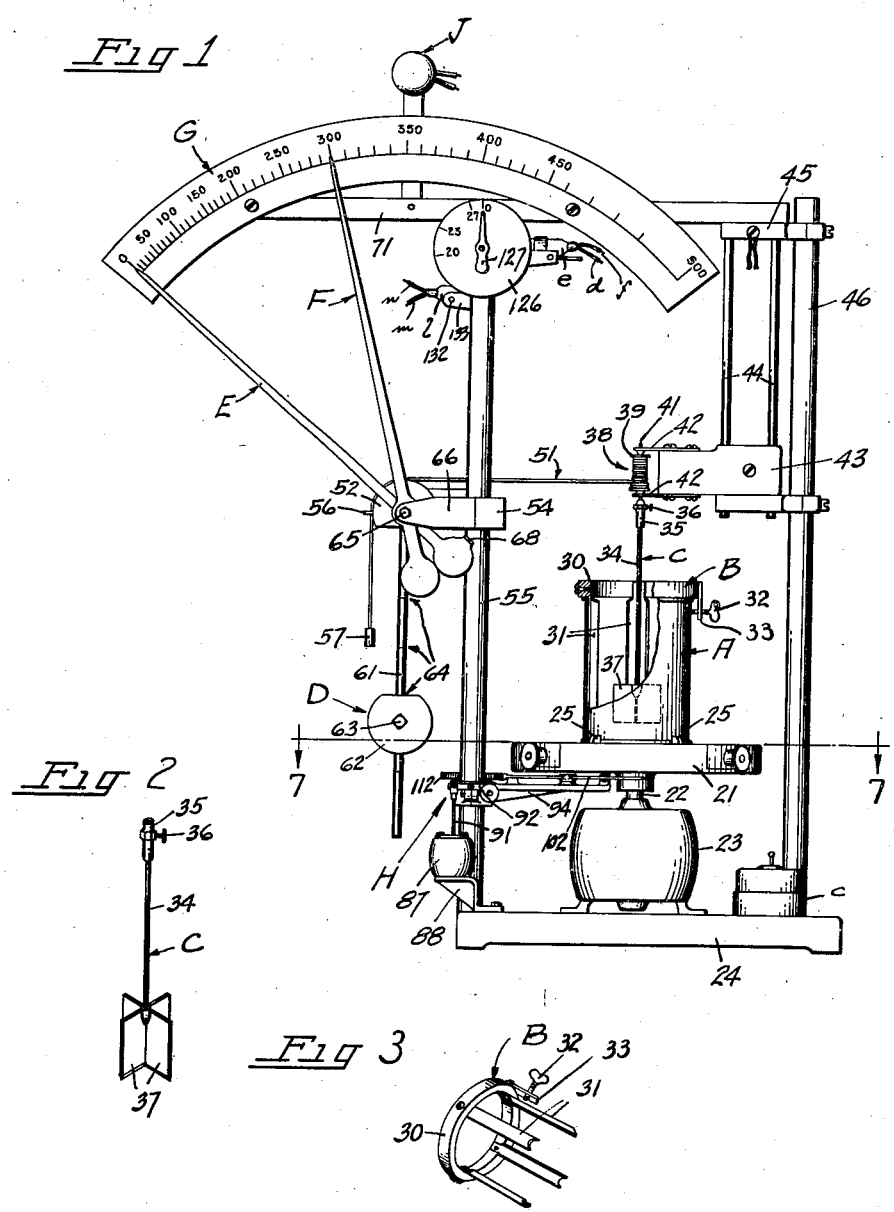

INVENTOR.
William McK. Martin
BY Ivan D. Thornburgh
Charles H. Cross
ATTORNEYS

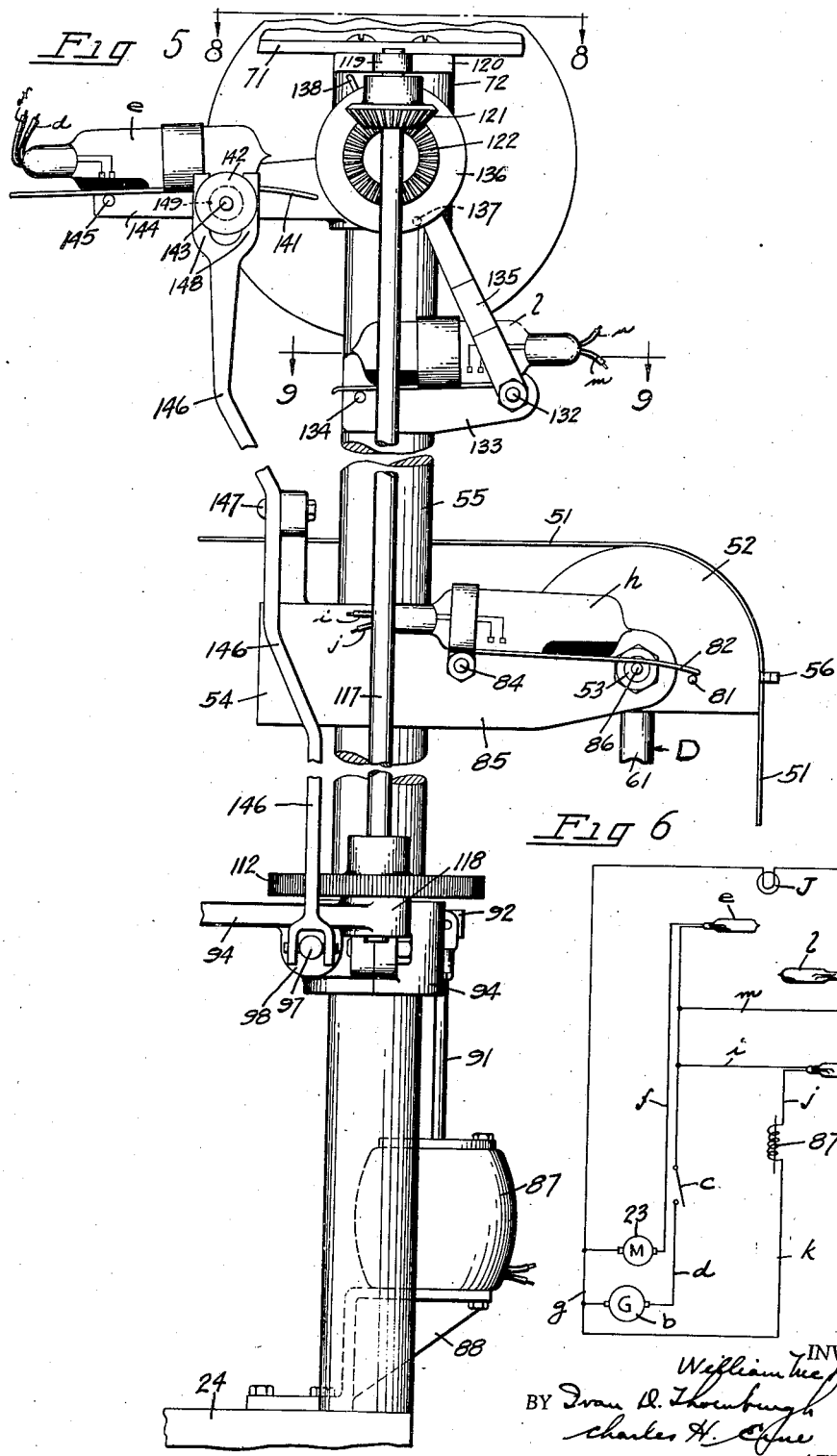

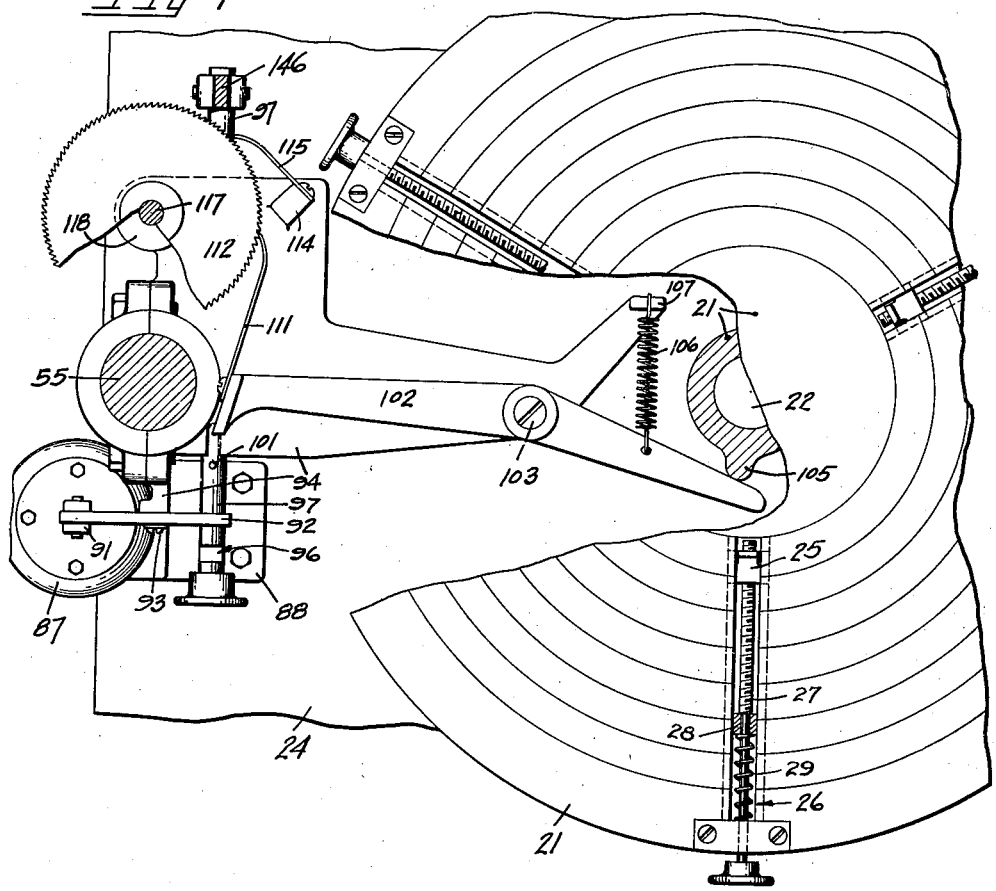

Patented Apr. 29, 1941

2,239,726

UNITED STATES PATENT OFFICE 2,239,726

DEVICE FOR MEASURING CONSISTENCY OF A PRODUCT

William McK. Martin, Maywood, Ill., assignor to American Can Company, New York, N. Y., a corporation of New Jersey Application January 11, 1938, Serial No. 184,463

10 Claims. (Cl. 265—11)

The present invention relates to a method of measurement and to measuring devices and has particular reference to the determination of certain consistency and setting-up characteristics of liquid or semi-liquid substances.

The invention has several and somewhat diversified applications for liquid and semi-liquid or paste-like materials and will be found of value in measuring different phases of consistency such as undisturbed or stirred consistency as well as the set-up form of a liquid or paste which may be termed the gelation value of the same.

In the canning industry it is often desirable to determine the different values of consistency including gelation of such products as cream style corn, pumpkin or pureed vegetables and pureed fruits and such values in many cases are found to be an accurate index to the commercial grade of the product. In the paint and varnish fields accurate measurements of consistency and gelation of paint and varnish materials provide a means of securing uniformity in different batches of the materials or make it possible to establish valuable characteristic standards.

Still another field of usefulness for the present invention which may be mentioned here by way of example is in the milling and baking industries where consistency measurements of the hydration capacity of wheat flour or similar materials, as by a flour water suspension, provide a measure of the quality of the flour. These are but a few examples of application of such measuring devices.

An object therefore of the invention is the provision of a method of measuring consistency phases or like characteristics of liquids, semi-liquids, pastes and similar substances and a further provision of a device for carrying out the steps of this method.

Another object of the invention is the provision of such a measuring device which will give uniform and accurate readings of the different phases of consistency in the same product and in a single cycle of readings.

Still another object is the provision of a measuring device which when being prepared for use will not disturb or alter the product being measured to the end that more accuracy of reading may be had.

A further object of the invention is the provision of an automatic measuring device for liquids and semi-liquid substances wherein readings of consistency and gelations are effected mechanically and uniformly with minimum chance for error.

Another object of the invention is the provision of a measuring device of the character described which will give an undisturbed consistency reading, a stirred consistency reading and a gelation reading if such different phases are all present or will give only such readings as are applicable under the particular circumstances.

Numerous other objects and advantages of the invention will be apparent as it is better understood from the following description, which, taken in connection with the accompanying drawings, discloses a preferred embodiment thereof.

Referring to the drawings:

Figure 1 is a front elevation, partly broken away of a measuring device for carrying out the steps of the method embodying the invention;

Fig. 2 is a perspective detail of a part of the instrument that goes into the liquid or semi-liquid being tested;

Fig. 3 is a perspective view of another part of the instrument;

Fig. 5 is an enlarged elevation viewed from the back;

Fig. 6 is a wiring diagram of certain electrical circuits used;

Fig. 7 is an enlarged sectional plan view of a part of the device taken substantially along the line 7—7 in Fig. 1 with parts broken away;

Fig. 8 is a top plan view of the upper portion of the instrument as viewed substantially along the line 8—8 in Fig. 5; and Fig. 9 is a fragmentary sectional detail taken substantially along the line 9—9 in Fig. 5.

Figure 4:
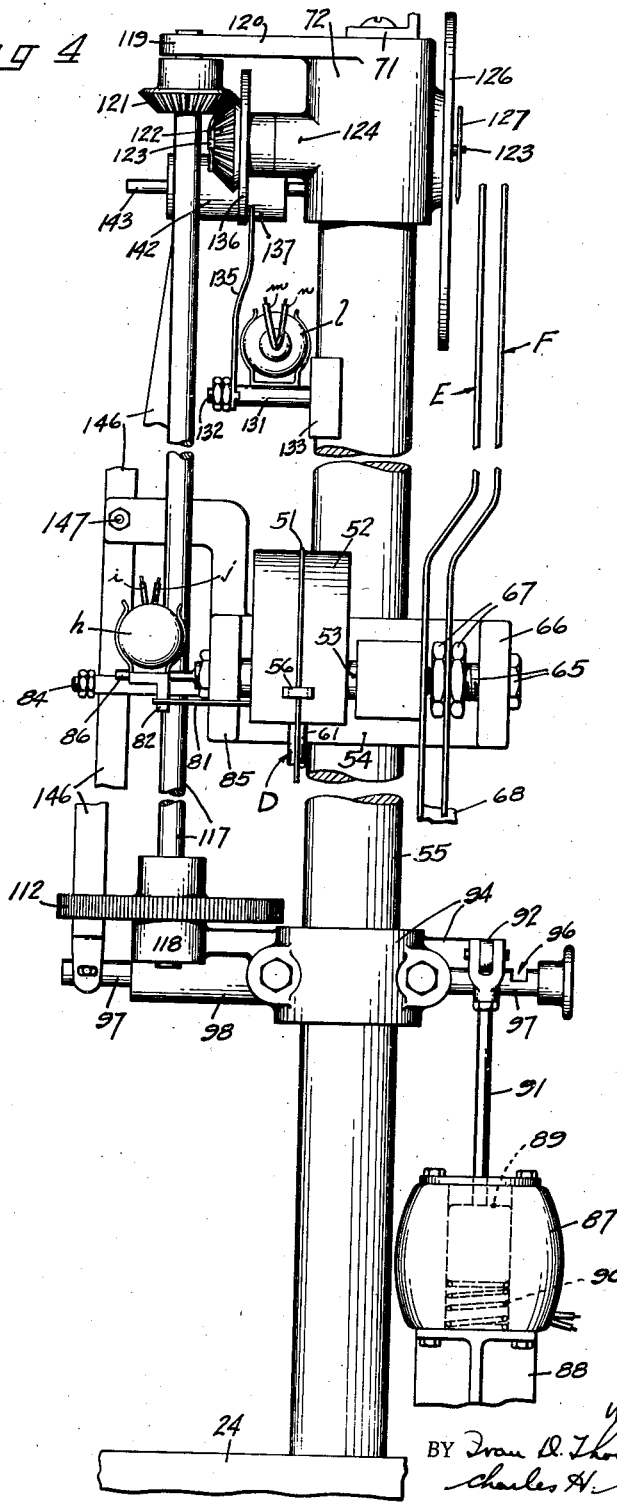
Fig. 4 is an enlarged side elevation of the instrument.

As a preferred embodiment of the invention and as illustrative of one use to which the invention may be applied the drawings illustrate one form of device which operates in accordance with the method of measurement of the consistency of a liquid or semi-liquid product which has been packed in cans. A specimen can indicated by the letter A in Fig. 1 exemplifies the article to be tested. Before beginning the consistency determination of the product in a can, the latter is first prepared by the removal of its cover so that the entire mouth of the can is open. Removal of the cover is done carefully so as to prevent agitation of the can contents.

An insert B (Fig. 3) is then carefully placed in the can adjacent the inside surface of its side wall. A paddle C (Fig. 2) also forming a part of the measuring device, is also inserted into the product so that it will be suspended as near the geometrical center of the can as possible. Insertion of the paddle should also be done very carefully and in a manner so that it will cut its way into the product without disturbing the structure of the latter.

Obviously where the product is not one to be tested in a can, a vessel which will properly hold the liquid or semi-liquid will be used in place of the can. The vessel or standardization unit so used will be prepared with the substance to be tested so that the proper gel or consistency conditions obtain as for a can product. The unit or can thus prepared is rotated.

Insert B prevents slippage between the product and the can side wall and hence effects a rotation of the product in harmony with the rotation of the can. The force of the product rotating against the paddle C results at first in a rotation of the paddle in time with the rotation of the can. When the rotating parts of the device and the can are in full motion the pull of a resisting force, such as a pendulum D, is applied to the paddle C in a direction opposite to the rotation of the latter. This pull tends to stop rotation and bring the paddle to rest against the force exerted on it by the rotating product.

As long as the resistance against change of the product is sufficient to exert a greater force on the paddle than the force occasioned by weight of the pendulum pull or other resisting force, the paddle will continue to rotate with the product and thus displace the pendulum from its vertical position. As the pendulum moves there results a progressively increasing force applied to the paddle and the angular displacement of the pendulum increases up until the pendulum pull is exactly equal to the force of the product against the paddle. When the pendulum pull and the product force are equal there occurs a shearing action between the peripheral walls of the cylindrical mass of product confined within the blades of the paddle and the surrounding and adjacent moving product mass. Then the paddle ceases to move with the product. This maximum pendulum pull is taken as a measure of the maximum or undisturbed consistency of the product and is indicated by a pointer E and a drag hand F on a graduated scale G forming a part of the measuring device.

Thus when the maximum consistency of the product is reached the product mass surrounding the central cylindrical portion will move past the stationary paddle C as the can continues to rotate. This might be termed the point of yield and after it is reached a stirring action takes place. Usually the product is in a sufficiently jelled or "set-up" state in the can to produce such a maximum reading and during such stirring its consistency will decrease as the stirring continues. This results in a progressive decrease of the force exerted by the product on the paddle and hence also results in a corresponding decrease in the pendulum pull until the latter exerts only just sufficient pull on the paddle to bring it to rest in the moving product. The decrease in the pendulum pull is indicated on the scale G by a falling back of the pointer E. The drag hand F remains stationary in its high position and thus continues to indicate the maximum or undisturbed consistency.

To obtain a true and accurate measure of the "setting-up" or gelation property of the product, this stirring action is continued for a given period of time after the maximum consistency is reached and then a second reading is taken. This second reading is indicated by the position of the pointer E at the end of the predetermined period and gives what may be termed the stirred consistency. The difference between the maximum or undisturbed consistency reading and the second or stirred consistency reading is taken as a measure of the "setting-up" of the product and may be termed the gelation value.

The period of time allowed before taking the second reading is uniform for all products. It is figured as being sufficiently long to permit the paddle to come to rest and remain stationary in the product. In order that human judgment be eliminated from this determination the device is provided with a timing unit H which begins to operate as soon as the maximum consistency of the product is indicated by the pointer E. The timing unit thereupon records twenty rotations of the can after the maximum reading as the desired stirring period. Termination of this period is indicated by the flashing of a lamp J. It is at such a time that the reading of the pointer E is taken. This is the stirred consistency reading. After seven more turns of the can the device automatically stops and the consistency and gelation determination is complete. This additional seven turns is to give some latitude in reading time.

Referring now in more detail to the drawings it will be noted that the specimen can A, which may be a standardization vessel filled with a product, is supported on a turn table 21 (Figs. 1 and 7) for the test. The turn table may be gear connected or otherwise driven from a motor. As illustrated in the drawings, it is shown as being mounted on the upper end of a rotor shaft 22 of a vertically disposed electric motor 23 which is secured to a suitable base plate 24. It is this motor which rotates the can during the test. Obviously if a prepared standardization vessel is used instead of the can, the vessel will be so rotated.

Electric energy is supplied to the motor from any suitable source of supply such as a generator b which is diagrammatically shown in the wiring diagram of Fig. 6. The energy is transmitted to the motor through a circuit which includes a main lead wire d, a closed service switch c, a motor mercury switch e, a wire f, motor 23, and a return lead wire g.

The turn table 21 is provided with a set of three or more can clamping jaws 25 which slide in T-slots 26 formed in the table. The jaws may be moved into can clamping position by screws 27. Concentric guide lines are formed in the top surface of the table for locating cans of different diameters in a central position.

One set of jaws 25 may be held under a spring tension so that when successive cans of the same diameter are being tested it is only necessary to pull back on one of the screws to remove a tested can and replace it by a new can to be tested. As illustrated in Fig. 7 one of the screws 27 is turned down or of reduced diameter at its outer end where it passes through a sliding block 28 which also slides in one of the T-slots 26. A spring 29 is held at its outer end. At the inner end, the spring presses against the block 28 and keeps its jaw 25 against the bottom of the can.

The insert B, which is placed in the can, or in the standardization vessel if that is used, to prevent slippage of the product therein, includes a metal ring 30 (Fig. 3) having secured thereto a plurality of curved vanes 31. When this insert B is in the opened can the ring seats on the top edge of the can and the vanes extend down into the product and engage against the inside surface of the can side wall. An insert is made to fit only one size of can or vessel, there being provided a plurality of inserts of different sizes to cover a wide range of different sized cans, etc. A thumb-screw 32 may be provided to clamp the insert to the wall of the can and this screw is threaded in a lug 33 extending down from the ring 30.

The paddle C which is also inserted into the can and which is therefore a removable part of the device is located directly over the center of the turn table 21. The paddle comprises a straight stem 34 (Fig. 2) having a socket 35 and a thumb screw 36 at its upper end and at the opposite or lower end a plurality of flat radial vanes 37 extending outwardly from the stem at right angles to each other. The socket or upper end of the paddle is secured to a windlass 38 having a drum 39 mounted on a vertical shaft 41 disposed directly over and aligned with the central axis of the turn table 21. The lower end of this shaft fits into the paddle socket 35 and is secured in place by the thumb screw 36. Thin sheet metal is preferably used in the construction of the paddle, the lower edges of which are sharpened to facilitate insertion into the product without disturbing it.

Windlass shaft 41 is carried in bearings 42 secured on a block 43 which is adapted to slide on a pair of vertically disposed rods 44. The upper and lower ends of these rods are retained in spaced brackets 45 which are fastened to a vertical support bar 46 mounted on the base plate 24 adjacent the turn table 21. This construction permits raising of the windlass and the paddle so that they will be out of the way while a can is being secured in place on the turn table and also permits lowering of the paddle into position in the product of the can as hereinbefore explained.

Drum 39 of the windlass 38 carries a cord, wire or cable 51 which takes over a disk 52 (see also Figs. 4 and 5) to which the pendulum D or other instrumentality of resisting force is secured. The disk is mounted on a short shaft 53 carried in a bracket 54 clamped on a vertically disposed support bar 55 secured in the base plate 24 adjacent the turn table 21. This support bar is diametrically opposite the support bar 46. The cord 51 is guided onto the disk 52 by a staple 56 inserted in the disk. At its free end the cord carries a small weight or bob 57.

When the paddle C rotates with the can A as at the beginning of a consistency determination the windlass 38 winds the cord 51 on the drum 39 pulling the bob 57 up toward the staple 56. This allows time for the moving parts of the device to get into full motion. When the bob engages against the staple 56 the rotating paddle tends to pull over or rotate the disk 52 and to bring the resisting force into play. It is this hooking up with the resisting force or counter-pull that applies the resistance against turning of the paddle.

The pendulum unit D, as exemplified in the drawings, comprises a depending rod 61 the upper end of which is threaded into the disk 52. A weight 62 is slidably disposed on the rod and may be secured in place at any desired position by a set screw 63. The rod is marked off by annular grooves 64 at equal spaces along its length so that the weight may be readily located in positions which lengthen the weight arm in convenient multiples of a unit which may be considered a minimum weight arm length. For example, when the weight is located at the second groove from the top the weight arm is twice the length of unit length as when the weight is at the top groove. The weight pull effective on the paddle is twice the minimum pull. By placing the weight at the third, fourth or fifth groove the weight arm is accordingly increased to three, four or five times the unit length or that of the first groove position. This permits quick changing or setting of the instrument to bring it within the range of the consistency phases of a given product.

Obviously any other form of weight, force, etc., that is capable of becoming effective as a counter-pull may be used instead of the pendulum.

The pointer E is moved at all times with the pendulum D. For this purpose the pointer is keyed in place on the short shaft 53 adjacent the disk 52. The drag hand F is axially mounted adjacent the pointer E on a stud 65 which is threaded into a lug 66 of bracket 54. Friction nuts 67 threaded on the stud engage the drag hand on both sides thereof and tend to hold the hand in whatever position it is placed. Movement of the drag hand by the pointer E is effected in one direction only by a lug 68 which projects outwardly from the pointer and into the path of travel of the drag hand.

The scale G is located adjacent the outer tips of the pointer E and drag hand F and is preferably graduated in terms of grams of force. The scale is carried on an angle iron brace 71 (see also Fig. 8) which is secured to the upper bracket 45 carried on support bar 46 and also to a bracket 72 mounted on top of the support bar 55.

Displacement of the pendulum D from its vertical position moves the pointer E and the drag hand F so that they indicate on the scale G the grams of force which the product in the can is exerting on the paddle C. For relatively thin liquid products this progressive force is gradually exerted until a maximum is reached. Thereupon both pointer and drag hand will come to rest and stay in the same position for the stirring period. The value indicated on the scale will be the measure of both undisturbed and stirred consistency and in that case gelation will be nil.

When a thicker or semi-fluid product is being tested and usually there is a gelling condition, displacement of the pendulum is rapid and both the pointer and the drag hand indicate the maximum consistency almost as soon as the pendulum pull is applied to the paddle. It is under such conditions that the timing unit H is useful in accurately providing a uniform stirring period of time at the end of which the second or stirred consistency reading is taken as heretofore explained.

The timing unit H is actuated at the first displacement of the pendulum D. This is effected by a pin 81 (Figs. 4 and 5) which is secured in the outer face of the disk 52. The pin projects outwardly into the path of a finger 82 which is secured to a normally open mercury timing switch h mounted on a pivot stud 84 carried in a lug 85 of the bracket 54. One end of the switch is supported on a pin extension 86 of the disk shaft 53. The action of the pin 81 striking the lug tilts the switch by raising it off its supporting pin extension 86 and thereby closes it.

Mercury timing switch *h* controls a solenoid 87 which is mounted vertically on a bracket 88 secured to the base plate 24. The solenoid is provided with a movable core 89 (Fig. 4) which is normally pressed upwardly by a spring 90. The upper end of the core is connected by a link 91 to the outer end of a latch 92 (see also Fig. 7) which is carried on a pivot screw 93 secured in a lug of a bracket 94 mounted on the support bar 55. At a certain time the inner end of the latch 92 is moved by the solenoid spring 90 into a notch 96 of a horizontal push rod 97. This rod is slidably retained in a bearing 98 of the bracket 94.

Push rod 97 carries a pin 101 which is adapted to engage against the outer end of a timing lever 102. This lever is mounted on a pivot screw 103 carried on the bracket 94. The push rod pin 101 normally holds the inner end of the timing lever out of engagement with the hub of the turntable 21. The hub is formed with a timing lug 105. The lever 102 is normally held against the push rod pin 101 by a tension spring 106 which is stretched between the inner end of the lever and a lug 107 on bracket 94.

The outer end of the timing lever 102 carries a flat spring-like ratchet pawl 111 which engages with the teeth of a ratchet wheel 112. When the timing lever is rocked on its pivot the moving pawl rotates the ratchet wheel in a counterclockwise direction (Fig. 7). A lug 114 secured to the bracket 94 supports a spring finger 115 which also engages the teeth of the ratchet wheel and this finger prevents backward movement of the latter.

The ratchet wheel 112 is mounted on a vertical shaft 117 (Fig. 5) which is carried at its lower end in a bearing 118 formed in the bracket 94. At its upper end the shaft is carried in a bearing 119 formed in an extension 120 of the scale bracket 72 on the support bar 55. Adjacent the bearing the shaft carries a bevel gear 121 (see also Fig. 4) which meshes with a mating bevel gear 122. Gear 122 is mounted on a counter-shaft 123 carried in a bearing 124 formed in the scale bracket 72. Counter-shaft 123 extends through a revolution counter-dial 126 and carries a dial hand 127. The counter-dial is mounted on the scale bracket 72 and is located just under the scale G where it is clearly visible from the front of the measuring device.

Reference should now again be had to the wiring diagram in Fig. 6. When the timing mercury switch *h* closes, an electrical circuit is established which includes the main lead wire *d*, a wire *i*, closed timing switch *h*, a wire *j*, solenoid 87, a wire *k* and a return by way of the main lead wire *g*. Current passing through this circuit energizes the solenoid 87 which thereupon draws its core 89 in or down against the action of the spring 90. The latch 92 is thereby tripped, its inner end moving up out of the notch 96 of push rod 97. This releases the timing lever 102 and the tension spring 106 thereupon draws the inner end of the lever into engagement with the hub of the rotating turn table 21 as shown in Fig. 7.

At each revolution of the turn table 21 the timing lug 105 rocks the timing lever 102 on its pivot screw 103. Thus the ratchet pawl 111 advances the ratchet wheel 112 through a partial revolution and this is recorded on the counter-dial 126 by a corresponding movement of the dial hand 127.

When the turn table has made the desired number of turns, for example twenty as indicated on the counter-dial 126, the lamp J is flashed as hereinbefore mentioned. This is effected by the actuation of a normally open flash mercury switch *l* and the consequent establishment of an electric circuit which includes the lamp and the switch.

The mercury switch *l* is mounted on a sleeve 131 which surrounds a pivot screw 132 threaded into a block 133 (see also Fig. 9) secured to the side of the support bar 55. The switch is supported at a slightly inclined angle, as shown in Fig. 5, by a pin 134 which is secured in the block 133. The sleeve also carries an arm 135 which projects upwardly adjacent a vertically disposed counter-disk 136 mounted on the hub of the counter-bevel gear 122. This disk is provided with a horizontal pin 137 secured in the inner face of the disk and also carries a radially disposed pin 138 which is fastened in the edge of the disk.

At the twentieth revolution of the turn table the horizontal pin 137 on disk 136 engages and shifts the switch arm 135 of the flash mercury switch *l*. This tilts the switch, raising it off of its supporting pin 134, thus closing the switch. Electric energy thereupon flows from the main lead wire *d* of the wiring diagram in Fig. 6, along a wire *m*, flash switch *l*, a wire *n*, lamp J, returning along the main lead wire *g*. The lamp J is thus illuminated and it is at this time that the stirred consistency reading is taken. The lamp remains lighted for preferably three revolutions of the turn table 21. At the end of this period the pin 137 on disk 136 rides off the switch arm 135 and thereby permits the flash mercury switch *l* to fall back into its original position on the support pin 134. This is the open position of the switch. The circuit is thus broken and the lamp is no longer illuminated.

This virtually completes the measurement or reading cycle but the turn table 21 is permitted to rotate through four more revolutions before stopping the device thereby bringing the total number of revolutions for the complete cycle to twenty-seven. At the end of this time the radial pin 138 on the counter-disk 136 engages a finger 141 on the normally closed motor mercury switch *e*. This switch is mounted on a sleeve 142 carried on a long pivot pin 143 which is secured in a lug 144 of the bracket 72. One end of the switch is supported on a pin 145 which is fastened in the lug 144. Accordingly when the switch finger 141 is engaged by the pin 138 the switch is tipped up and is thereby opened. This breaks the motor circuit hereinbefore explained and hence the motor stops. This stops the rotation of the turn table 21 and also the other moving parts of the device.

The counter-disk pin 138 remains in engagement with the motor switch finger 141 when the motor stops and hence holds the motor switch *e* in its tilted open position requiring manual operation for starting. This prevents accidental starting of the motor.

When a new test or measurement determination is ready to be made the motor may be started by pushing in the push rod 97. For this purpose the push rod is connected to the lower end of a link 146 which is carried on a pivot screw 147 secured in the timing switch bracket 54. The upper end of the link is bifurcated providing two prongs 148 which extend into a groove 149 formed in the sleeve 142 (see also Fig. 8) of the motor mercury switch e.

Hence when the push rod 97 is pushed in, the link 146 is rocked on its pivot screw 147. The upper bifurcated end of the link thus shifts sidewise the sleeve 142 and its tilted and open switch e thereby moving its finger 141 clear of the counter-disk pin 138. The switch is thus released and thereupon falls back on its supporting pin 145 into a closed position. This reestablishes the motor circuit and starts the measuring cycle. It is this starting of the motor by pushing in the push rod 97 that permits the timing latch 92 to fall down into the notch 96 formed in the push rod and to thereby hold the rod in position until again released by the solenoid 87 at the beginning of a timing period as hereinbefore explained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for measuring consistency phases of liquid and semi-liquid products, comprising in combination a paddle element insertable in the product leaving it undisturbed, means including a turntable device for supporting and rotating the product to transmit movement thereof to said paddle element, oscillatory instrumentalities connected with said paddle element and responsive to the force of gravity to apply a pull on said paddle element which is counter to the rotating forces imposed by the rotating product, means actuated by said turntable device for timing the duration of rotation of said product, and means for registering the amount of said pull as a phase of consistency of the product.

2. An apparatus for measuring consistency phases of liquid and semi-liquid products, comprising in combination a paddle element insertable in the product leaving it undisturbed, means including a turntable device for supporting the product and for effecting relative movement between the product and the paddle element, oscillatory instrumentalities connected with said paddle element and responsive to the force of gravity to apply a pull on said paddle element which is counter to said relative movement, means in part actuated by said turntable device for timing and controlling the duration of said relative movement between the product and paddle element, and means for measuring said pull as a phase of consistency of the product.

3. An apparatus for measuring consistency phases of liquid and semi-liquid products, comprising in combination a vessel element for retaining the product to be tested, a turntable device for supporting said vessel, a paddle element insertable in the product leaving it undisturbed, means for rotating said turntable to transmit rotation to said vessel, oscillatory instrumentalities connected to said paddle element and responsive to gravitative forces for exerting a pull which is counter to the forces of rotation, means actuated by said turntable for timing the duration of rotation of said vessel, and means for measuring said counter-pull as a phase of consistency of the product.

4. An apparatus for measuring consistency phases of liquid and semi-liquid products, comprising in combination a paddle element insertable in the product leaving it undisturbed, means including a turntable device for supporting and rotating the product to transmit movement thereof to said paddle element, an oscillatory resisting element connected with said paddle element and responsive to gravitative forces to apply a pull on said paddle element which is counter to the rotating forces imposed by the rotating product, means actuated by said turntable device for controlling the duration of rotation of said product, a pointer connected with said resisting element, and a graduated scale located adjacent said pointer, said pointer indicating on said scale the amount of said pull of said resisting element as a phase of consistency of the product.

5. An apparatus for measuring consistency phases of liquid and semi-liquid products, comprising in combination a paddle element insertable in the product leaving it undisturbed, means including a turntable device for supporting and rotating the product at a constant speed to transmit said rotative movement to said paddle element, an oscillatory resisting element connected with said paddle element and adapted to apply a pull thereon which is counter to the rotating forces imposed by the rotating product, means actuated by said turntable device for timing and controlling the duration of rotation of said product, a pointer connected with said resisting element, a drag hand mounted adjacent said pointer and adapted to be moved into registering position thereby, and a graduated scale located adjacent said pointer, said pointer indicating on said scale the amount of pull of said resisting element as a phase of consistency of the product, said drag hand registering on said scale the maximum pull of said resisting element.

6. An apparatus for measuring consistency phases of liquid and semi-liquid products, comprising in combination a vessel for retaining the product to be tested, a device insertable into said vessel adjacent the periphery of the latter for holding the product against slippage therein, a paddle element insertable into the product leaving it undisturbed, means including a turntable for supporting and rotating said vessel and thus said product to transmit rotative movement thereof to said paddle element, oscillatory instrumentalities connected with said paddle element and responsive to the force of gravity to apply a pull on said paddle element which is counter to the rotating forces imposed by the rotating product, means actuated by said turntable for timing and controlling the duration of rotation of said product, and means for registering the amount of said pull as a phase of consistency of the product.

7. An apparatus for measuring consistency phases of liquid and semi-liquid products including the measurement of gelation, comprising in combination a paddle element insertable in the product leaving it undisturbed, means including a turntable device for supporting and rotating the product to transmit movement thereof to said paddle element, oscillatory instrumentalities connected with said paddle element and adapted to apply a pull thereon which is counter to the rotating forces imposed by the rotating product, means for registering the amount of said pull, the maximum pull on said paddle element being taken as a measure of the unstirred consistency of the product, and a timing unit actuated and controlled by said turntable for determining a time period at the end of which said instrumentalities register a minimum or stirred consistency of the product, the difference in value between the maximum and minimum measurements constituting the gelation phase of said product.

8. An apparatus for measuring consistency phases of liquid and semi-liquid products, comprising in combination a paddle element insertable in the product leaving it undisturbed, means for rotating the product to transmit rotative movement thereof to said paddle element, a windlass secured to said paddle element and having a flexible element connected therewith, a movable disk having a lost motion take-up connection with said flexible element, a pendulum fastened to said disk and adapted to be oscillated by said flexible element after lost motion has been taken up to apply a pull on said paddle element which is counter to the rotating forces imposed by the rotating product when the rotating paddle element winds the flexible element up on said windlass, and means for registering the amount of said pull as a phase of consistency of the product.

9. An apparatus for measuring consistency phases of liquid and semi-liquid products, comprising in combination a paddle element insertable in the product leaving it undisturbed, means including a turntable for supporting and rotating the product to transmit movement thereof to said paddle element, a pendulum connected with said paddle element and adapted to be oscillated by said flexible cord to apply a pull on said paddle element which is counter to the rotating forces imposed by the rotating product, means for adjusting said pendulum for changing the degree of pull on said paddle element to bring the pull within the range of the consistency of the product being tested, means actuated by said turntable for timing the duration of rotation of said product, and means for registering the amount of said pull as a phase of consistency of the product.

10. An apparatus for measuring consistency phases of liquid and semi-liquid products, comprising in combination a vessel for retaining the product to be tested, a turntable for supporting and rotating said vessel, means carried by said turntable for centering said vessel on said table, a paddle element disposed over the center of said turntable and insertable into the product, a guide unit on which said paddle element is supported and is vertically movable and by which said paddle element is guided into said product leaving it undisturbed, oscillatory instrumentalities connected with said paddle element and responsive to the force of gravity to apply a pull on said paddle element which is counter to the rotating forces imposed by the rotating product, means actuated by said turntable for controlling the duration of rotation of said vessel, and means for registering the amount of said pull as a phase of consistency of the product.

WILLIAM McK. MARTIN.